Feb. 16, 1965     T. L. FAWICK     3,169,552
HOSE

Original Filed July 19, 1960     2 Sheets-Sheet 1

INVENTOR.
THOMAS L. FAWICK
BY
RICHEY, McNENNY & FARRINGTON
William J. Flynn
ATTORNEYS Feb. 16, 1965 — T. L. FAWICK — 3,169,552
HOSE Original Filed July 19, 1960 — 2 Sheets-Sheet 2

INVENTOR.
THOMAS L. FAWICK
BY RICHEY, McNENNY & FARRINGTON
William J. Flynn
ATTORNEYS

United States Patent Office 3,169,552
Patented Feb. 16, 1965

3,169,552
HOSE
Thomas L. Fawick, Shaker Heights, Ohio
(% Hotel Statler-Hilton, Cleveland 14, Ohio)
Continuation of application Ser. No. 43,785, July 19, 1960. This application Feb. 27, 1963, Ser. No. 265,573
5 Claims. (Cl. 138—133)

This application is a continuation of my co-pending application, Serial No. 43,785, filed July 19, 1960, now abandoned.

This invention relates to a hose composed primarily of elastomeric or rubber-like material.

It is the principal object of this invention to provide a novel and improved hose of this general type which has greater strength for a given wall thickness and/or weight of the hose.

Another object of this invention is to provide such a hose which may be manufactured economically.

Another object of this invention is to provide an improved hose of novel construction which enables the strength of a hose with a given wall thickness to be selectively varied.

In accordance with the present invention, the foregoing objects are accomplished by a hose construction in which the elastomeric or rubber-like material of the hose has embedded therein, and bonded thereto, a series of transverse metal reinforcement elements constituted by the successive turns of a continuous helix of suitable metal, such as steel. These reinforcement elements in cross-section have a substantially longer dimension radially of the hose than lengthwise of the hose and are substantially non-distortable radially. Due to the presence of these transverse reinforcement elements, the hose presents a much greater resistance to radial deformation than it would in the absence of such elements. The strength of the hose for a given wall thickness may be increased simply by positioning these transverse reinforcement elements closer together.

Further objects and advantages of the present invention will be apparent from the following detailed description of certain presently-preferred embodiments thereof, which are shown in the accompanying drawings.

Figure 1:
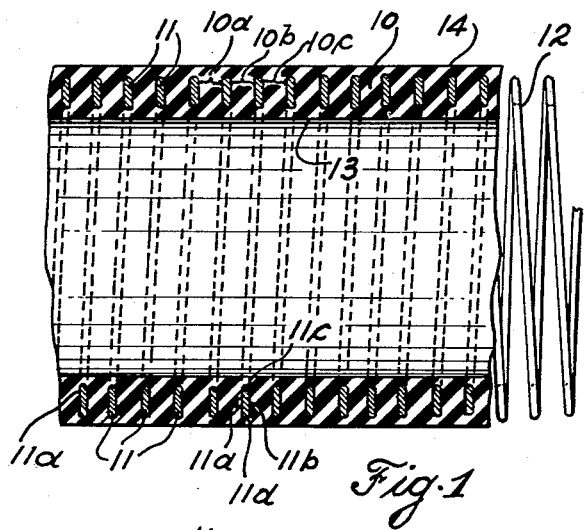
FIG. 1 is a fragmentary axial section of a hose constructed in accordance with the present invention and in which the transverse reinforcement elements are provided by the turns of a continuous helix.
Figure 4:
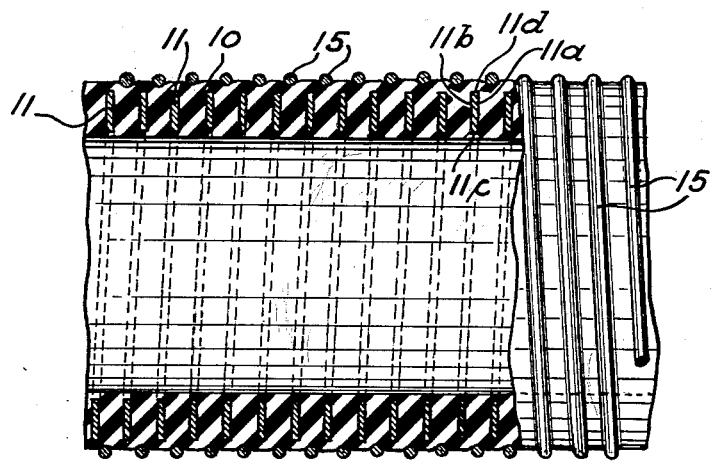
Figure 5:
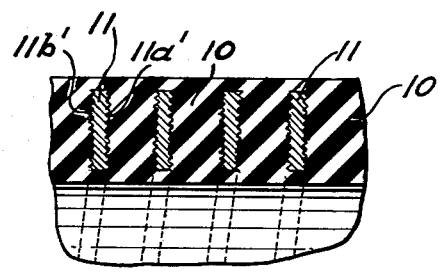

FIG. 4 is a fragmentary axial sectional view of a hose similar to that of FIG. 1, but modified by the provision of a reinforcing wire helix around the outside; and FIG. 5 is a fragmentary axial sectional view of still another embodiment in which the reinforcing helix embedded in the hose wall is formed with corrugated or serrated faces for enhanced surface bonding to the rubber-like material of the hose wall.

Referring first to FIG. 1, the hose shown therein comprises an elongated tubular body 10 of elastomeric or rubber-like material. This material may be natural or synthetic rubber or any other suitable material having properties which make it desirable for use in a hose or the like. The hose wall has embedded therein, and surface bonded throughout to the rubber-like material 10, such as by vulcanization, a series of transverse metal reinforcement elements 11 in succession along the length of the hose. As shown in FIG. 1, the hose wall is of uniform thickness and the reinforcement elements 11 are completely disposed within the thickness of the hose wall between the cylindrical outer surface 14 and the cylindrical inner surface 13 of the hose. These reinforcement elements are constituted by the successive turns of a continuous flat-rolled steel wire helix 12 extending coaxially about the axis of the hose.

In accordance with the present invention, the metal of the reinforcing helix in cross-section has a substantially longer dimension radially of the hose than lengthwise of the hose. As shown in FIG. 1, in axial section each successive turn of the helix presents opposite flattened major faces 11a and 11b which extend substantially radially of the hose. The rubber-like material 10 of the hose is surface-bonded to these major faces across their entire radial extent, as well as being bonded to the thinner inner and outer edges 11c and 11d of the helix. As shown in FIG. 1, each reach 10a, 10b, 10c, etc. of rubber-like hose material which is trapped between successive turns 11 of the reinforcing helix, is relatively short lengthwise of the hose (compared to the total length of the hose), but is relatively thick radially, constituting a substantial portion of the complete wall thickness of the hose. The helix itself is substantially non-distortable radially and it restrains the radially thick reaches 10a, 10b, 10c, etc. of rubber-like material trapped between the major faces 11a and 11b of successive turns of the helix against deforming radially in response to pressure from the inside or outside of the hose. The substantial thickness and relatively short axial extent of each of these reaches 10a, 10b of rubber-like material in the hose wall enable them to effectively resist radial forces tending to deform the hose wall, so that the hose has greatly improved strength because of this novel construction.

The strength of the present hose depends upon both the axial length and the radial thickness of each reach 10a, 10b, 10c, etc. of rubber-like material trapped between the transverse reinforcement elements 11. The greater the axial spacing between the reinforcement elements 11, the lower the strength. The greater the radial thickness, the greater the strength. Both of these factors can be varied readily so as to provide a hose having the desired strength.

For example, for a given hose thickness, if the successive turns of the metal helix 12 are close together, as shown in FIG. 1, then the hose will have a very high burst strength.

Figure 2:
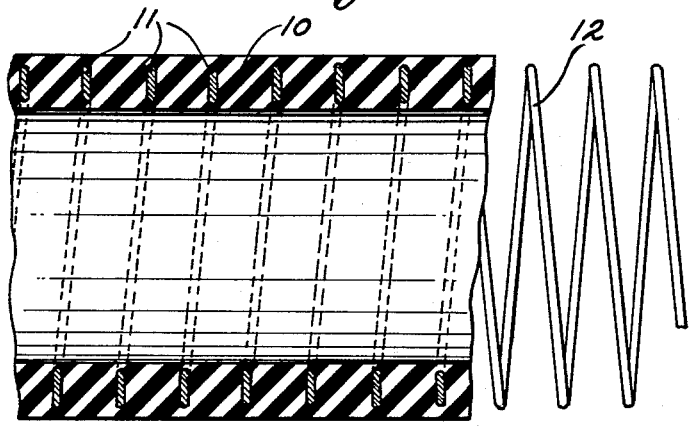
FIG. 2 is a similar view of a second embodiment in which the turns of the helix are spaced farther apart.

However, if the hose is not required to be so strong, then the successive turns of the metal helix 12 may be farther apart, as shown in FIG. 2. This, of course, would enhance the flexibility of the hose, which may be desirable for certain uses. The embodiment shown in FIG. 2 is identical to that shown in FIG. 1, except for the spacing of the turns of the metal helix.

Figure 3:
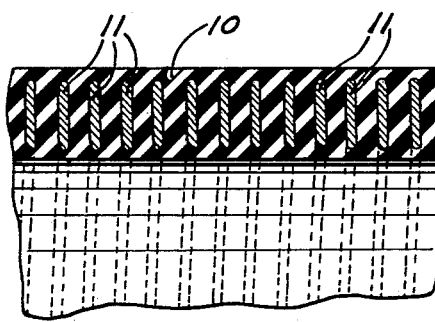
FIG. 3 is a similar view showing a third embodiment in which the hose wall is thicker and the reinforcement elements are thicker radially.

In the embodiment shown in FIG. 3 the hose is substantially stronger than that of FIG. 1 by virtue of the increased wall thickness of the rubber-like hose material 10 and the increased radial thickness of the transverse reinforcement elements 11 provided by the turns of the metal helix 12.

FIG. 4 shows a still further embodiment, which is identical to that shown in FIG. 1, except that the strength of the hose is enhanced by the provision of a reinforcing wire helix 15 wound around the outside of the hose. This outside helix 15 has the same pitch and direction as the metal helix 12 which is embedded in the hose, but the turns of the outside helix 15 are disposed midway between the turns of the inside helix 12.

The outside helix 15 may be of steel wire which is deformed to helical shape by being wrapped tightly around the outside of the hose so as to bite into the rubber-like material of the hose wall.

For example, the wire 15 may be unwound from a spool and wound around the outside of the hose body while under sufficient tension to cause the wire to sink into the rubber-like hose wall and exert an appreciable clamping effect thereon.

This outside helix 15 also prevents abrasion of the rubber-like hose wall if the hose is dragged along the ground.

FIG. 5 shows a still further embodiment in which the reinforcing helix has its major faces 11a' and 11b' corrugated or serrated, so as to enhance the bond to the rubber-like material of the hose by providing an increased bonding surface area for a given radial dimension of the helix in cross-section.

From the foregoing explanation it will be apparent that in each of the illustrated embodiments the radial strength of the hose is greatly enhanced by the provision of the transverse reinforcement elements bonded in the hose. Also, for a given weight of the transverse reinforcements per unit length of the hose, the hose has improved flexibility as compared with previous wire-reinforced hose constructions. In addition the strength of the hose in lengthwise tension is improved. It should be noted that this enhanced radial strength of the hose holds true for outside pressure, as well as pressure within the hose, so that the present invention is particularly well-suited for use as a large diameter suction hose of the type used in dredging operations.

The present hose construction lends itself to economical manufacture on a mass production basis, particularly where the transverse reinforcement elements are provided by a continuous helix.

While there have been described herein and illustrated in the accompanying drawings several presently-preferred embodiments of this invention, it is to be understood that various modifications and refinements which depart from the disclosed embodiments may be adopted without departing from the spirit and scope of the invention. For example, the hose may be provided with conventional braiding, if desired.

I claim:

1. A hose comprising a tubular wall of rubber-like material, and a reinforcing wire helix having its successive turns extending helically about the axis of the hose and disposed completely within the thickness of the hose wall, the wire of said helix being substantially thicker radially of the hose than lengthwise of the hose and presenting substantially radially disposed opposite major faces which throughout their extent are bonded directly to said rubber-like material of the hose wall, said rubber-like material of the hose wall throughout its extent between successive turns of the helix having a radial extent at least as great as that of the adjacent turns of the helix.

2. The hose of claim 1 wherein said helix is of flat-rolled steel wire and is substantially non-expandable radially.

3. A hose comprising a tubular wall of rubber-like material having a substantially uniform radial thickness throughout its length, and a metal reinforcing helix having its successive turns extending helically about the axis of the hose and disposed completely within the thickness of the hose wall, said helix being substantially inextensible radially and in cross-section being substantially thicker radially of the hose than lengthwise of the hose, each turn of said helix presenting substantially radially disposed opposite major faces which are vulcanized directly to said rubber-like material of the hose wall, said rubber-like material of the hose wall throughout its extent between successive turns of the helix being radially coextensive with said opposite major faces and having a radial thickness at least as great as that of the adjacent turns of the helix.

4. The hose of claim 3 wherein said opposite major faces of the helix are corrugated for increased surface contact with the rubber-like material of the hose wall.

5. The hose of claim 3 wherein there is provided an outside reinforcing helix gripping the outside of the hose wall between the turns of the first-mentioned helix.

References Cited by the Examiner
UNITED STATES PATENTS

| | | | |
|---|---|---|---|
| 132,006 | 10/72 | Harris | 138—133 XR |
| 1,281,557 | 10/18 | Goodall | 138—133 |
| 2,176,762 | 10/39 | Forbes | 138—122 XR |
| 2,330,651 | 9/43 | Welger | 138—133 |
| 2,810,424 | 10/57 | Swartswelter et al. | |
| 2,953,618 | 9/60 | Buono et al. | 138—121 |

EDWARD V. BENHAM, *Primary Examiner.*